US007657894B2

(12) United States Patent
Ma (10) Patent No.: US 7,657,894 B2
(45) Date of Patent: Feb. 2, 2010

(54) DETECTING LOCK ACQUISITION HIERARCHY VIOLATIONS IN MULTITHREADED PROGRAMS

(75) Inventor: Zhiquiang Ma, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 1247 days.

(21) Appl. No.: 10/955,605

(22) Filed: Sep. 29, 2004

(65) Prior Publication Data

US 2006/0070076 A1 Mar. 30, 2006

(51) Int. Cl.
*G06F 9/46* (2006.01)
*G06F 11/00* (2006.01)
(52) U.S. Cl. .............................. 718/104; 714/2; 714/48
(58) Field of Classification Search ................. 718/100, 718/104; 714/2, 48
See application file for complete search history.

(56) References Cited

U.S. PATENT DOCUMENTS

| | | | | | |
|---|---|---|---|---|---|
| 5,666,532 A | * | 9/1997 | Saks et al. | ................... | 707/205 |
| 5,682,530 A | * | 10/1997 | Shimamura | ................. | 718/104 |
| 5,774,731 A | * | 6/1998 | Higuchi et al. | ............... | 710/200 |
| 5,960,199 A | * | 9/1999 | Brodsky et al. | ............. | 717/128 |
| RE36,422 E | * | 11/1999 | Pazel | ........................... | 717/125 |
| 6,026,362 A | * | 2/2000 | Kim et al. | ....................... | 705/1 |
| 6,593,940 B1 | * | 7/2003 | Petersen et al. | ............. | 715/700 |
| 6,748,470 B2 | * | 6/2004 | Goldick | ...................... | 710/200 |
| 7,051,033 B2 | * | 5/2006 | Agarwal et al. | ............. | 707/100 |
| 7,337,179 B1 | * | 2/2008 | Plain | ........................... | 707/101 |
| 7,496,918 B1 | * | 2/2009 | Dice et al. | ................... | 718/100 |
| 7,516,446 B2 | * | 4/2009 | Choi et al. | ................... | 717/128 |
| 2003/0101300 A1 | * | 5/2003 | Goldick | ...................... | 710/200 |
| 2004/0025164 A1 | * | 2/2004 | Ma et al. | ...................... | 718/107 |
| 2005/0022157 A1 | * | 1/2005 | Brendle et al. | ............... | 717/104 |

\* cited by examiner

*Primary Examiner*—Meng-Ai An
*Assistant Examiner*—Caroline Arcos
(74) *Attorney, Agent, or Firm*—Blakely, Sokoloff, Taylor & Zafman LLP (57) ABSTRACT

A method, apparatus, and system are provided for monitoring resource operations and detecting lock acquisition hierarchy violations in multithreaded programs. In one embodiment, a lock acquisition hierarchy graph is constructed to facilitate monitoring of resource operations performed by each of a plurality of threads of a multithreaded program. The resource operations performed by each thread are monitored by a monitor. Any violation in the hierarchy is detected by a detector, which is triggered with an occurrence of a change in the graph.

23 Claims, 9 Drawing Sheets

DETECTING LOCK ACQUISITION HIERARCHY VIOLATIONS IN MULTITHREADED PROGRAMS

BACKGROUND

1. Field of the Invention

Embodiments of this invention relate to multithreaded computing systems. More particularly, an embodiment of the present invention relates to lock acquisition hierarchy violation detection in multithreaded programs.

2. Description of Related Art

In a multithreaded program, different threads can handle different tasks and proceed in parallel to improve speed and efficiency. These different threads can share resources and some resources are shared only in a manner that is mutually exclusive. The mutually exclusive resources may include, but are not limited to, synchronization objects such as critical sections, mutex locks, and writer locks.

When different threads in a multithreaded program acquire multiple sets of mutually exclusive resources while holding some other mutually exclusive resources, a consistent order of resource acquisitions has to be followed by each of such threads to acquire the resources. The consistent order is referred to as a lock acquisition hierarchy. The term "lock" may be used synonymously and interchangeably with the term "resource" throughout this disclosure. Failing to adhere to a consistent resource acquisition order is regarded as a lock acquisition hierarchy violation. Lock acquisition hierarchy violations can potentially cause various problems, such as program deadlocks. Lock acquisition hierarchy violations are often regarded as program errors.

BRIEF DESCRIPTION OF THE DRAWINGS

The appended claims set forth the features of the embodiments of the present invention with particularity. The embodiments of the present invention, together with its advantages, may be best understood from the following detailed description taken in conjunction with the accompanying drawings of which:

DETAILED DESCRIPTION

Described below is a system and method for monitoring resource operations and detecting lock acquisition hierarchy violations in multithreaded programs.

Throughout the description, for the purposes of explanation, numerous specific details are set forth in order to provide a thorough understanding of the embodiments of the present invention. It will be apparent, however, to one skilled in the art that the present invention may be practiced without some of these specific details. In other instances, well-known structures and devices are shown in block diagram form to avoid obscuring the underlying principles of the present invention.

In the following description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the present invention. It will be appreciated, however, to one skilled in the art that the embodiments of the present invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

Various embodiments of the present invention may be provided as hardware or as a computer program product, which may include a machine-readable medium having stored thereon instructions, which may be used to program a computer (or other electronic devices) to perform a process according to various embodiments of the present invention. The machine-readable medium may include, but is not limited to, floppy diskette, optical disk, compact disk-read-only memory (CD-ROM), magneto-optical disk, read-only memory (ROM), random access memory (RAM), erasable programmable read-only memory (EPROM), electrically erasable programmable read-only memory (LEPROM), magnetic or optical card, flash memory, or another type of media/machine-readable medium suitable for storing electronic instructions. Moreover, various embodiments of the present invention may also be downloaded as a computer program product, wherein the program may be transferred from a remote computer to a requesting computer via a communication link (e.g., a modem or network connection).

Figure 1:
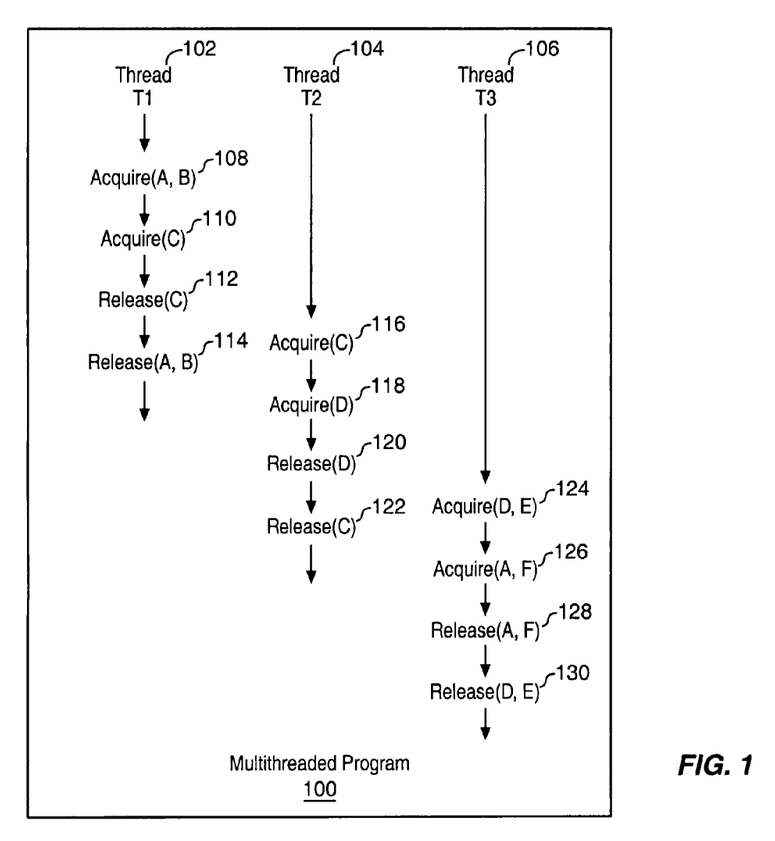
FIG. 1 is a block diagram illustrating a multithreaded program having multiple threads acquiring/releasing multiple resources.

FIG. 1 is a block diagram illustrating a multithreaded program 100 having multiple threads 102-106 acquiring/releasing multiple resources. In the illustrated embodiment, the program 100 has three threads, thread 102, thread 104, and thread 106. Each of the threads 102-106 may perform various activities, including acquiring various sets of resources and releasing various sets of resources as necessitated or desired. When a thread 102-106 is to acquire one or more mutually exclusive shared resources, the thread either proceeds to acquire the resources if the resources are not currently held by other threads or the thread waits until the requested resources are released by other threads if the requested resources are currently held by other threads. For example, thread 102 first acquires resources (A, B) 108 and then acquires resource (C) 110 and then releases resource (C) 112 and then releases resources (A, B) 114. Thread 104 acquires resource (C) 116 before thread 102 releases resources (A, B), but after thread 102 releases resource (C), and then acquires resource (D) 118 and then releases resource (D) 120 and then releases resource (C) 122. Thread 106 acquires resources (D, E) 124 before thread 104 releases resource (C) but after thread 104 releases resource (D), and then acquires resources (A, F) 126 and then releases resources (A, F) 128 and then releases resources (D, E) 130.

The acquisitions of mutually exclusive shared resources A, B, C and D by threads 102-104 help form a lock acquisition hierarchy (hierarchy) of (A, B), C, and D, which infers that a thread of threads 102-106 is to first acquire resource A and then acquire resource D if the thread needs to acquire resources both A and D but in separate operations. Thread 106, however, acquires resources (A, F) 126 after having acquired resources (D, E) 124. In other words, thread 106 acquires resource D before acquiring resource A. This may violate the hierarchy of (A, B), C, and D. If thread 102, thread 104 and thread 106 are scheduled differently so that thread 102 acquires resources (A, B) 108 first, then thread 104 acquires resource (C) 116 before thread 102 is to acquire resource (C) 110, and then thread 106 acquires resources (D, E) 124 before thread 104 is to acquire resource (D) 118, the program 100 may deadlock and none of the threads 102-106 can progress because thread 102 is waiting for thread 104 to release resource C, thread 104 is waiting for thread 106 to release resource D, and thread 106 is waiting for thread 102 to release resource A.

When different threads 102-106 in a multithreaded program 100 acquire multiple sets of mutually exclusive resources, such as resources of A-F, while holding some other mutually exclusive resources, such as resources of A-F, a consistent order of resource acquisitions, such as the order of (A, B), C, D, is to be followed by each of such threads 102-106 to acquire the resources. The consistent order is referred to as the lock acquisition hierarchy. Failing to adhere to a consistent resource acquisition order, such as thread 106 first acquiring resource D, then acquiring resource A, is regarded as a lock acquisition hierarchy violation (violation). Such violations can potentially cause various problems including program deadlocks.

Figure 2:
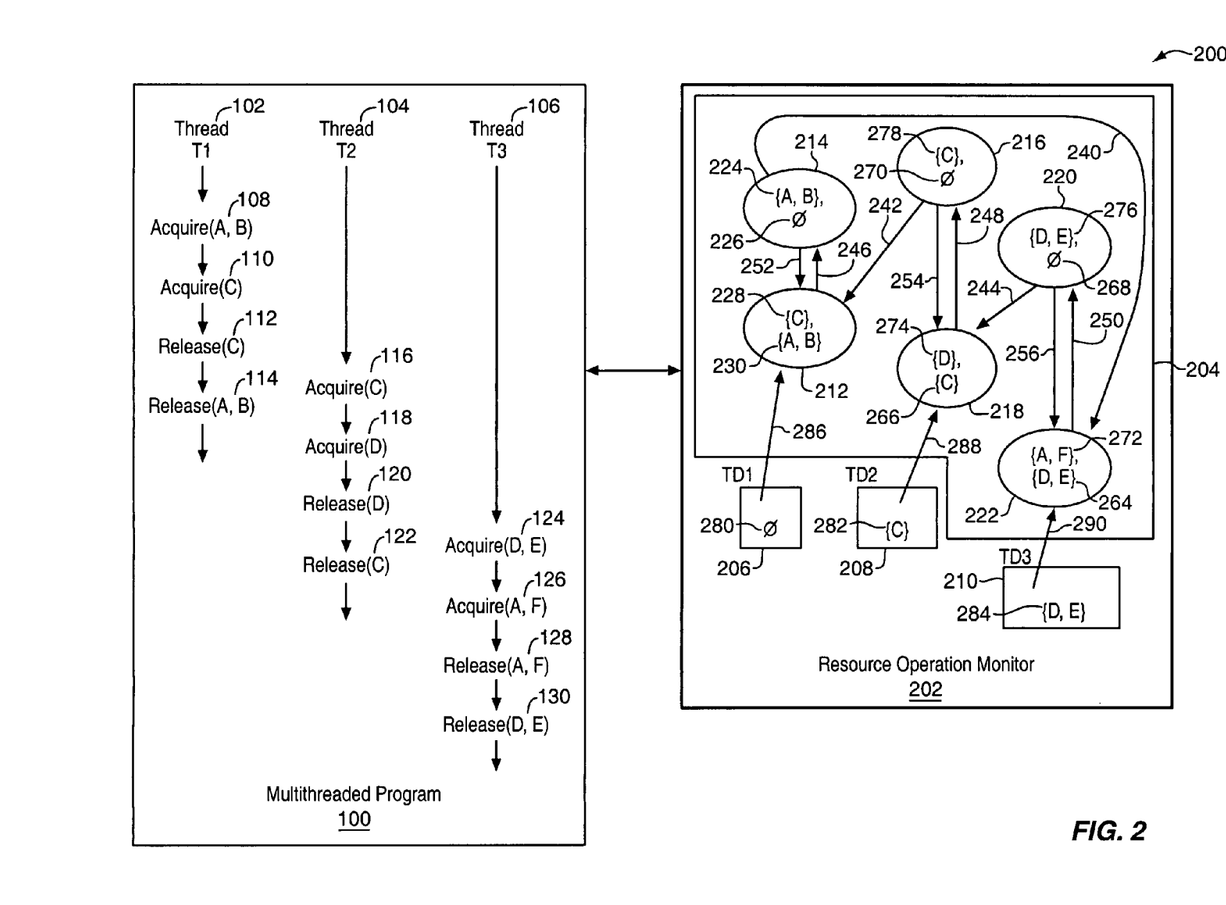
FIG. 2 is a block diagram illustrating an embodiment of a resource operation monitor and lock acquisition hierarchy violation detector having a resource operation monitor.

FIG. 2 is a block diagram illustrating an embodiment of a resource operation monitor and lock acquisition hierarchy violation detector mechanism 200 having a resource operation monitor (monitor) 202. In one embodiment, using the multi-threaded program (program) 100 of FIG. 1, a monitor 202 is employed to monitor each resource operation including acquiring resources and releasing resources performed by each thread 102-106 in the program 100. In one embodiment, the monitor 202 monitors the resource acquisition operations 108-110, 116-118, 124-126 and the resource release operations 112-114, 120-122, 128-130 of the program 100. The monitor 202 constructs a lock acquisition hierarchy graph (graph) 204 for the program 100 and maintains a thread descriptor 206-210 corresponding to each thread 102-106.

In one embodiment, the graph 204 constructed by the monitor 202 includes one or more lock acquisition nodes (nodes) 212-222. Each node 212-222 in the graph 204 represents an acquisition of one or more resources, such as the acquisition 108-110, 116-118, 124-126, by a thread 102-106 in the program 100, while holding zero or more resources.

Each node 212-222 may include two sets of resources, acquired resources (LH_ACQUIRED) and held resources (LH_HELD), representing a thread acquiring resources LH_ACQUIRED while holding resources LH_HELD. For example, node 214 has (A, B) 224 as acquired resources and none (Ø) 226 as held resources, showing a set of resources (A, B) 224 being acquired by a thread while holding none resources (Ø) 226. Another node 212 has (C) 228 as acquired resources and (A, B) 230 as held resources, showing resource (C) 228 being acquired by a thread while holding resources (A, B) 230. In other words, node 214 can represent the acquisition of resources (A, B) 108 in program 100 because at the time of the acquisition of resources (A, B), no other resources were being held by a thread 102. Node 212 can represent the acquisition of resource (C) 110 by thread 102, because thread 102 was holding resources (A, B) 230 while acquiring resource (C) 228. Similarly, each of the other nodes 216-222 of the graph 204 can represent acquisition of resources 272-278 by a thread 102-106 while holding resources 264-270.

In one embodiment, the nodes 212-222 are further associated with a variety of links. For example, there can be three different kinds of links: LH_PARENT parent links, LH_CHILD child links and LH_CROSS cross links. In one embodiment, each of the nodes 212-222 may have zero or one parent link, zero or more child links, and zero or more cross links. A parent link LH_PARENT links a node to its parent node or parent, a child link LH_CHILD links a node to one of its child nodes or children, and a cross link LH_CROSS links a node to one of its cross nodes.

In one embodiment, a node having empty held resources (LH_HELD) may not have a parent. For example, node 214 has empty held resources (LH_HELD) and does not have a parent. However, a node having non-empty held resources (LH_HELD) has a parent, which represents a preceding resource acquisition, and a parent link is established from this node to its parent node; conversely, this node is a child of its parent and there is a child link from its parent to this node. For example, in thread 102, acquisition of resources (A, B) 108 represented by node 214 precedes the acquisition of resource (C) 110 represented by node 212 and the held resources (LH_HELD) of node 212 is (A, B) 230, which is not empty. Thus, node 214 is regarded as the parent of node 212 and a parent link 246 from node 212 to node 214 is established, while node 212 is regarded as a child node of node 214 and a child link 252 is established from node 214 to node 212.

Furthermore, cross links 240-244 are illustrated from one node (linked-from node) to another node (linked-to node) of nodes 212-222 if the acquired resources (LH_ACQUIRED) of the linked-from node and the acquired resources (LH_ACQUIRED) of the linked-to node contain one or more common resources and the linked-to node has a parent. For example, cross link 240 is from node 214 to node 222 with the acquired resources (LH_ACQUIRED) of both nodes 214 and 222 having (A) as the common resource and node 222 having a parent node 220. Similarly, cross link 242 is from node 216 to node 212 with the acquired resources (LH_ACQUIRED) of both nodes 212 and 216 having the common resource of (C) and node 212 having a parent node 214, and cross link 244 is from node 220 to 218 with the acquired resources (LH_ACQUIRED) of both nodes 220 and 218 having the common resource of (D) and node 218 having a parent node 216. Stated differently, for any two different nodes, such as first and second nodes, in the graph 204, if the acquired resources (LH_ACQUIRED) of theses two nodes have one or more common resources and the second node has a parent, the second node is a cross node of the first node and there is a cross link (LH_CROSS) established from the first node to the second node.

When a new node is added to the graph 204, a parent link, a child link, and one or more cross links may accordingly be established. If the held resources (LH_HELD) of the new node are not empty, the new node has a parent and a parent link (LH_PARENT) from the new node to its parent is established; and the new node then becomes a child of its parent and a child link (LH_CHILD) is established from its parent to the new node. A cross link (LH_CROSS) is established from the new node to an existing node if the acquired resources (LH_ACQUIRED) of the new node and the existing node have one or more common resources and the existing node has a parent; and a cross link (LH_CROSS) may also be established from an existing node to the new node if the acquired resources (LH_ACQUIRED) of the existing node and the new node have one or more common resources and the new node has a parent.

For example, when thread 104 acquires resource (C) 116, node 216, having acquired resources (LH_ACQUIRED) (C) 278 and empty held resources (LH_HELD) (Ø) 270, is added. Because node 216 has empty held resources (LH_HELD) 270, there is no need for a parent link or child link to be established. However, the acquired resources (LH_ACQUIRED) 228, 278 of two nodes 212 and 216 have a common resource (C) and node 212 has a parent node 214, so a cross link (LH_CROSS) 242 is established from node 216 to node 212. As another example, when thread 106 acquires resources (A, F) 126, node 222, having acquired resources (LH_ACQUIRED) (A, F) 272 and held resources (LH_HELD) (D, E) 264, is added. Because node 222 has non-empty held resources (LH_HELD) (D, E) 264, a parent link (LH_PARENT) 250 from node 222 to node 220 and a child link (LH_CHILD) 256 from node 220 to node 222 are established. Also, the acquired resources (LH_ACQUIRED) 272, 224 of two nodes 222 and 214 have a common resource (A) and node 222 has a parent 220, so a cross link (LH_CROSS) is established from node 214 to node 222.

In one embodiment, each node 212-222 is also assigned a flag (LH_MARK), which can be either marked or unmarked for lock acquisition hierarchy violation detection purposes. Initially, when a new node is added to the graph 204, its flag (LH_MARK) is set to unmarked.

Furthermore, in one embodiment, each thread 102-106 has a corresponding thread descriptor 206-210. Each thread descriptor 206-210 may have one set of resources, such as held resources (TH_HELD) 280-284 and one current position link (TH_CURRENT) 286-290 to link a descriptor 206-210 to a lock acquisition node 212, 218, 222 in the graph 204. Each thread descriptor 206-210 may be used to describe the status of its corresponding thread 102-106. The held resources TH_HELD 280-284 represent the resources the corresponding thread is currently holding, while the current position link TH_CURRENT 286-290 represents the current position of the corresponding thread 102-106 in the graph 204. For example, thread descriptor 210, having held resources TH_HELD (D, E) 284 and current position link TH_CURRENT 290 linking to node 222, shows that thread 106 was holding resources (D, E) 264 and its position in the graph was node 222 when it acquired resources (A, F) 272.

In one embodiment, the resource acquisitions 108-110, 116-118, 124-126 by different threads 102-106 are represented by nodes 212-222 respectively, while the status of each thread 102-106 is represented by its corresponding thread descriptor 206-210. It is contemplated that this is simply an example and a snapshot of the graph 204 and the thread descriptors 206-210 at a particular moment. It is contemplated that the graph 204 and descriptors 206-210 may change from time to time during the lifetime of the monitored multithreaded program 100.

The monitor 202 continuously monitors resource operations in the program 100, constructs the graph 204, and maintains the thread descriptors 206-210 for various threads 102-106. The monitor 202 adds new nodes and new links to the graph 204. The monitor 202 modifies the held resources TH_HELD and current position link TH_CURRENT of the thread descriptors 206-210. A lock acquisition hierarchy violation detector (detector) (e.g., detector 302 of FIG. 3), however, is triggered or invoked when a new node is created in the graph 204 and the new node has a parent node. For example, the creation of the new node 222 triggers the detector because the node 222 is a new node and it has a parent 220.

Figure 3:
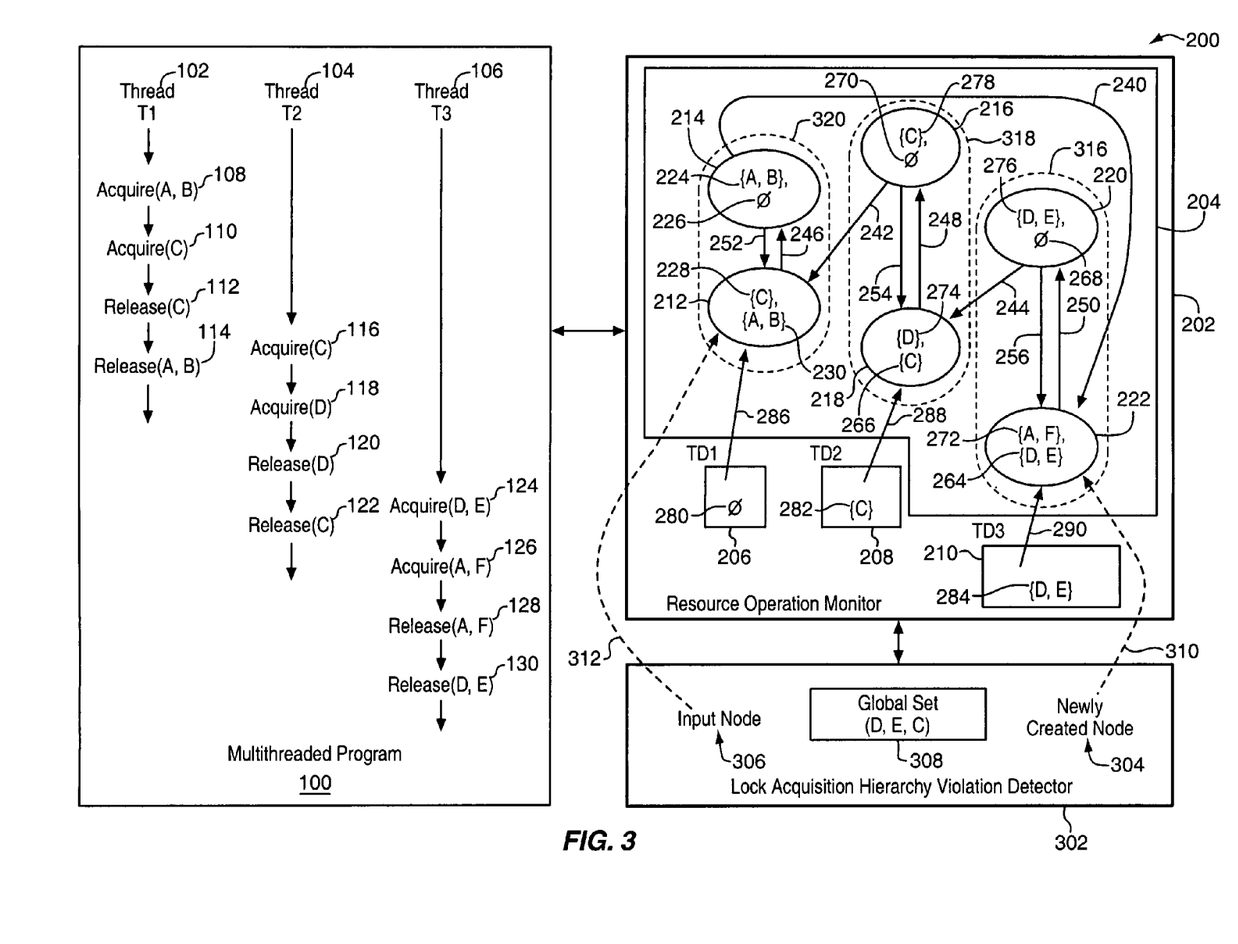
FIG. 3 is a block diagram illustrating an embodiment of a resource operation monitor and lock acquisition hierarchy violation detector having a resource operation monitor and a lock acquisition hierarchy violation detector.

FIG. 3 is a block diagram illustrating an embodiment of a resource operation monitor and lock acquisition hierarchy violation detector mechanism 200 having a monitor 202 and a detector 302. In one embodiment, the detector 302 is invoked by changes in the graph 204. For example, the detector 302 is invoked or triggered when a new node is created and added in the lock acquisition hierarchy graph 204 and the new node has a parent node. The monitor 202, on the other hand, monitors resource operations, such as acquisitions 108-110, 116-118, 124-126 and releases 112-114, 120-122, 128-130, constructs the graph 204, and maintains the thread descriptors 206-210.

In one embodiment, the detector 302 is triggered when a new node (e.g., 222) having a parent node (e.g., 220) is created and added to the graph 204. The detector 302 seeks one or more cycles consisting of nodes, parent links, and cross links in the graph 204 that are found to be satisfying a set of conditions. In graph 204, nodes 222, 220, 218, 216, 212 and 214, parent links 250, 248 and 246, and cross links 244, 242 and 240 form such a cycle. In one embodiment, a cycle found to be satisfying the set of conditions indicates that a violation has occurred. Once a violation is detected, the detector 302 then reports the violation to the user (e.g., programmer, developer, or administrator). If no cycle is found to be satisfying the set of conditions, no violation is detected or reported. The detector 302 may go back to sleep, until it is again triggered with the creation of a node having a parent.

The set of conditions may include one or more of the conditions disclosed below. One condition is that the newly created node having a parent is on the cycle. In graph 204, node 222, a newly created node having a parent node 220, is on the cycle consisting of nodes 222, 220; 218, 216; and 212, 214.

Second condition refers to starting with the newly created node 222, the cycle can be divided into segments 316-320 connected by cross links 240-244. Nodes of each segment 316-320 are connected by parent links. For example, in graph 204, the cycle consists of 3 segments 316 (222-220), 318 (218-216), and 320 (214-212). The newly created node 222 starts the segment 316, in which nodes 222 and 220 are connected by a parent link 250. In segment 318, nodes 218 and 216 are connected by a parent link 248. In segment 320, nodes 212 and 214 are connected by a parent link 246. The three segments 316-320 are connected by cross links 240-244 to form a cycle. Segment 316 is connected with segment 318 by a cross link 244 from node 220, the last node of segment 316, to node 218, the first node of segment 318. Segment 318 is connected with segment 320 by a cross link 242 from node 216, the last node of segment 318, to node 212, the first node of segment 320. Similarly, segment 320 and segment 316 are connected by a cross link 240 from node 214, the last node of segment 320, to node 222, the first node of segment 316.

In one embodiment, the third condition states that held resources (LH_HELD) of the first nodes of any two segments of 316-320 do not contain common resources. For example, nodes 222 and 218 have held resources (LH_HELD) (D, E) 264 and (C) 266, respectively, but there are no common resources in their held resources. Similarly, nodes 218 and 212 have held resources (LH_HELD) (C) 266 and (A, B) 230, respectively, but there are no common resources in their held resources. Further, nodes 212 and 222 have held resources (LH_HELD) (A, B) 230 and (D, E) 264, respectively, but there are no common resources in their held resources. Here, the aforementioned cycle of graph 204 satisfies the third condition.

In one embodiment, the fourth condition states that if a first segment 316 is connected with the second segment 318 by a cross link 244 from the last node 220 of the first segment 316 to the first node 218 of the second segment 318, then there are one or more common resources among the following three sets of resources: the acquired resources (LH_ACQUIRED) 274 of the first node 218 of the second segment 318, the acquired resources (LH_ACQUIRED) 276 of the last node 220 of the first segment 316, and the resources which are in the held resources (LH_HELD) 264 of the first node 222 of the first segment 316 but are not in the acquired resources (LH_ACQUIRED) of any nodes, excluding the first node 222 and the last nodes 220, of the first segment 316. In graph 204, the acquired resources (LH_ACQUIRED) 274 of the first node 218 of the second segment 318 is (D), the acquired resources (LH_ACQUIRED) 276 of the last node 220 of the first segment 316 are (D, E). The held resources (LH_HELD) 264 of the first node 222 of the first segment 316 are (D, E). Since the first segment 316, in this example, has only two nodes 220 and 222, the resources which are in the held resources (LH_HELD) 264 of the first node 222 of the first segment, but are not in the acquired resources (LH_AC-QUIRED) of any nodes, excluding the first node 222 and the last nodes 220, of the first segment 316, are still (D, E). So the common resource among the three aforementioned sets of resources is (D). It is contemplated that the first segment 316 may include a number of other nodes, i.e., nodes other than the node 222 and 220. The illustrated cycle satisfies the fourth condition.

In one embodiment, when a new node having a parent node is added to the graph 204, the detector 302 is invoked to detect whether there are lock acquisition hierarchy violations. The detector 302 may use a global set and call a recursive function. The function may run recursively (e.g., call itself for a number of times) to look for one or more cycles satisfying a set of conditions (in graph 204, nodes 222, 220; 218, 216; and 212, 214 form such a cycle). Every time the recursive function is called, a node in the graph is taken as input. In one embodiment, the set 308 refers to a global set containing (D, E, C). Node 304 is a newly added node 222, as indicated by an arrow 310 pointing to the node 222. Similarly, node 306 is an input node 212 for an invocation of the recursive function at a certain time or stage while the detector 302 is running, as indicated by an arrow 312 pointing to node 212. The arrows 310, 312 may not be regarded as links and are simply used to illustrate which node is the newly added node and which node is an input node for an invocation of the recursive function. FIG. 3 is an example and a snapshot of the newly created node 304, the global set 308, and the input node 306 to an invocation instance of the recursive function call at a particular moment while the detector 302 is invoked and running when node 222 is created and added to the graph 204. It is contemplated that the newly created node 304, the global set 308, and the input node 306 to an invocation instance of the recursive function call may change from time to time during the lifetime of the monitored multithreaded program 100.

Figure 4A:
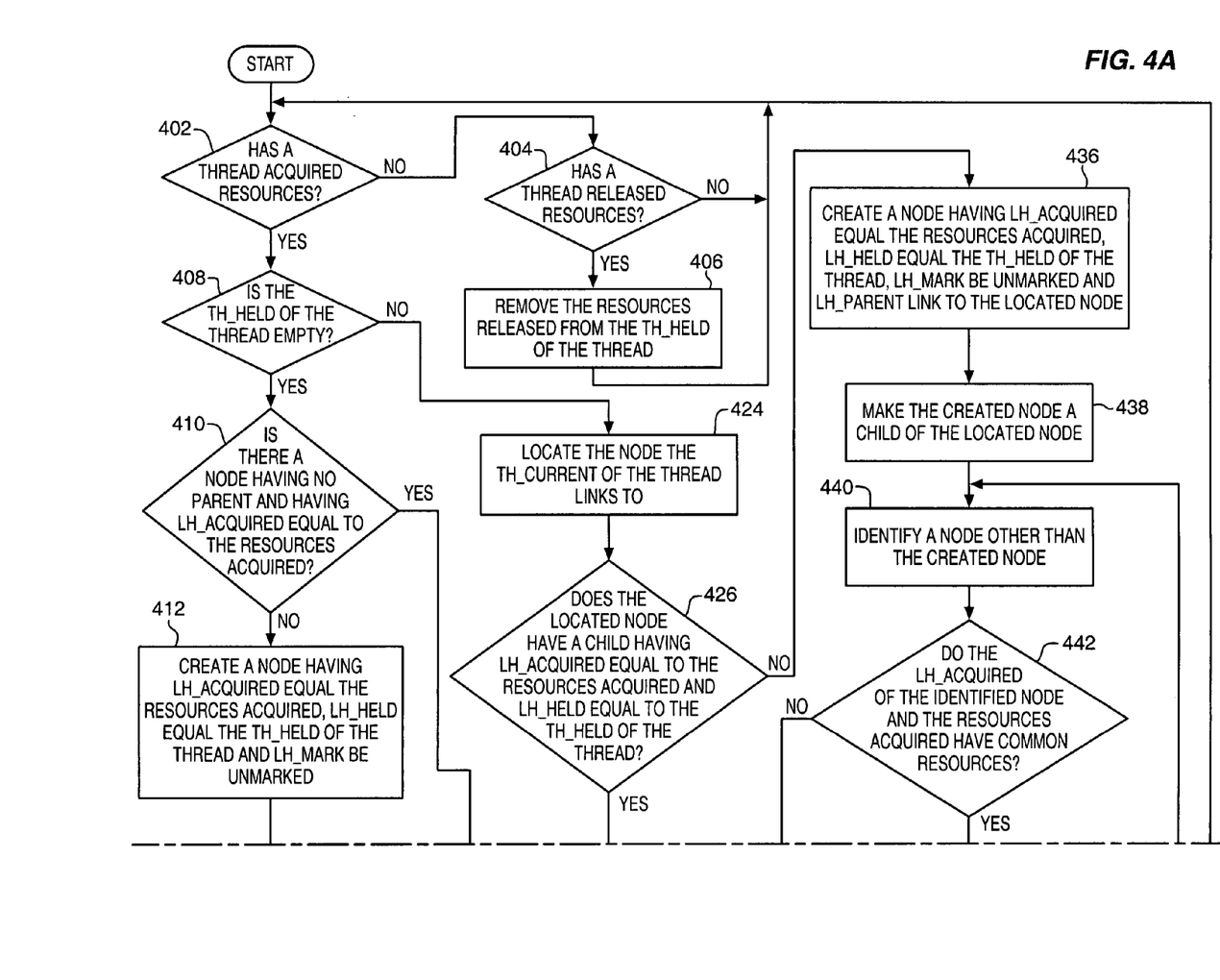
FIGS. 4A and 4B are flow diagrams illustrating an embodiment of a process for monitoring resource operations in a multithreaded program.
Figure 4B:
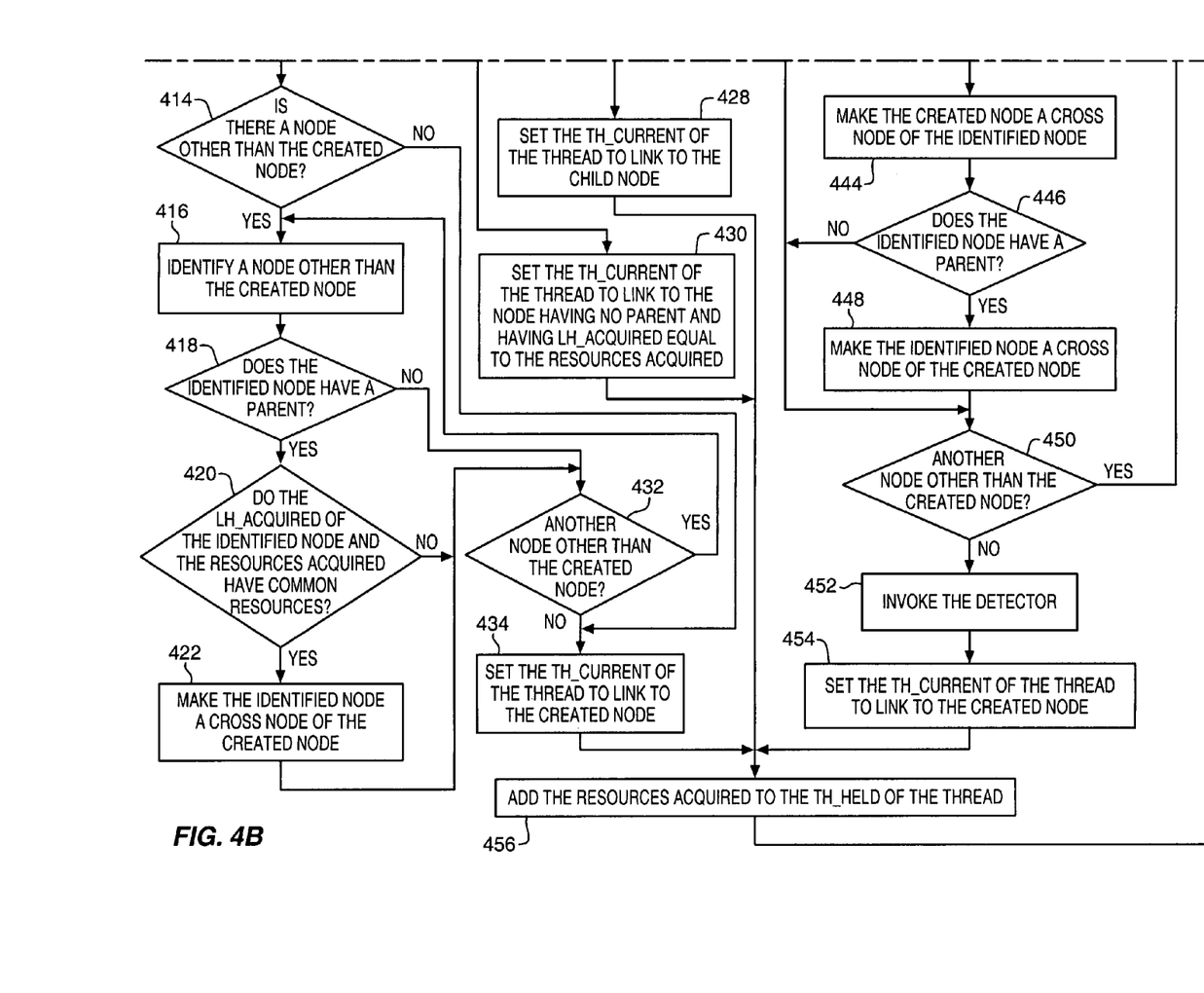

FIGS. 4A and 4B are flow diagrams illustrating an embodiment of a process for monitoring resource operations in a multithreaded program. The monitor observes each resource acquisition operation and each resource release operation by each thread. Starting with decision block 402, a determination is made as to whether a thread has acquired resources. If a thread has not acquired resources, the monitor continues, at decision block 404, to determine whether a thread has released resources. If a thread has released resources, the resources released are removed from the held resources (TH_HELD) in its corresponding thread descriptor at processing block 406. The process then continues with decision block 402. If a thread has not released resources, the process returns to decision block 402 and continues monitoring resource operations. Referring back to decision block 402, if a thread has acquired resources, a determination is made as to whether the thread's held resources (TH_HELD) recorded in its descriptor are empty at decision block 408. If empty, the monitor searches the existing lock acquisition nodes in the graph to determine whether there is a node which does not have a parent and the acquired resources (LH_ACQUIRED) of which are equal to the resources acquired at decision block 410. If such a node is found, the monitor sets the thread's current position in the graph to the found node by setting the current position link (TH_CURRENT) in its corresponding descriptor to link to the found node at processing block 430. Then, the monitor adds the resources acquired to the held resources (TH_HELD) of the thread in its corresponding descriptor at processing block 456, and the monitor returns back to block 402 and continues to observe and monitor resource operations performed by the multithread program.

Referring back to decision block 410, if such a node is not found, at processing block 412, the monitor creates a new node and adds the new node to the graph, making the acquired resources (LH_ACQUIRED) of the new node be equal to the resources just acquired, and the held resources (LH_HELD) of the new node be equal to the held resources (TH_HELD) of the thread in the corresponding thread descriptor. The newly created node may not have a parent and its LH_MARK flag is set to unmarked. Further, the monitor tries to identify cross nodes of the newly created node and creates cross links from the newly created node to its cross nodes. First, at decision block 414, the monitor checks to determine whether there is a node other than the created node in the graph. If there are no other nodes, the newly create nodes doesn't have cross nodes so far and identifying cross nodes of the newly created node is done and the current position link (TH_CURRENT) of the thread is linked to the newly created node at processing block 434. The monitor may then add the resources acquired to the held resources (TH_HELD) of the thread recorded in its corresponding thread descriptor at processing block 456 and continue to observe and monitor resource operations of the multithreaded program at decision block 402. If there is another node, the monitor identifies the node other than the newly created node at processing block 416. Then, a determination is made as to whether the identified node has a parent at decision block 418. If yes, the monitor determines whether the acquired resources (LH_ACQUIRED) of the identified node and the resources acquired have common resources at decision block 420. If yes, the identified node is made a cross node of the created node at processing block 422 with a cross link (LH_CROSS) created from the created node to the identified node.

The process then continues with decision block 432 with a determination as to whether there is another node other than the newly created node. If yes, the monitor continues with identifying that node at processing block 416. If not, identifying cross nodes of the newly created node is done and the current position link (TH_CURRENT) of the thread is linked to the newly created node at processing block 434. The monitor may then add the resources acquired to the held resources (TH_HELD) of the thread recorded in the corresponding thread descriptor at processing block 456 and continue to observe and monitor resource operations of the multithreaded program at decision block 402. Similarly, if outcome of decision blocks 418 or 420 is negative, the process continues at decision block 432. In other words, the monitor continues to choose another node and repeats the process until the nodes other than the newly created node has been chosen.

Referring back to decision block 408, in one embodiment, if the held resources (TH_HELD) of the thread in its descriptor are not empty, the monitor locates the current position of the thread in the graph by following the TH_CURRENT link in the descriptor of the thread at processing block 424. Then, at decision block 426, the monitor searches the children of the located current position node of the thread for a node such that the acquired resources (LH_ACQUIRED) of which are equal to the resources just acquired and the held resources (LH_HELD) of which are equal to the held resources (TH_HELD) of the thread recorded in the corresponding thread descriptor. If such a node is found, the monitor sets the thread's current position in the graph to the found node by setting the TH_CURRENT link in the corresponding thread descriptor to link to the found node at processing block 428. The monitor may then add the resources acquired to the held resources (TH_HELD) of the thread recorded in the corresponding thread descriptor at processing block 456 and continue to observe and monitor resource operations of the multithreaded program at decision block 402. If such a node is not found, the monitor creates a new node and adds the new node in the graph, making the acquired resources (LH_ACQUIRED) of the new node be equal to the resources just acquired, the held resources (LH_HELD) of the new node be equal to the held resources (TH_HELD) of the thread recorded in the corresponding thread descriptor at processing block 436. Further, also at processing block 436, the flag LH_MARK of the newly created node is set to unmarked and the monitor also makes the located current position node the parent of the newly created node by creating a parent link from the newly created node to the located current position node. The newly created node is then made a child of the located current position node by creating a child link from the located current position node to the newly created node at processing block 438.

The monitor then seeks to identify cross nodes of the newly created node. At processing block 440, the monitor identifies a node other than the created node. At decision block 442, the monitor determines whether acquired resources (LH_ACQUIRED) of the identified node have any common resources with the resources just acquired. If yes, the newly created node is made a cross node of the identified node with a cross link (LH_CROSS) created from the identified node to the newly created node at processing block 444. At decision block 446, the monitor determines whether the identified node has a parent node. If yes, the identified node is made a cross node of the newly created node with a cross link (LH_CROSS) created from the newly created node to the identified node at processing block 448. If the outcome of decision block 442 or 446 is negative, the process continues with another determination as to whether there is another node other than the newly created node at processing block 450. If yes, the node is identified by the monitor at processing block 440 and the process continues thereon. This process repeats until all of the nodes other than the newly created node has been identified and chosen. If not, the identifying cross nodes of the newly created node is done and the detector is invoked at processing block 452. At the conclusion of detection, the monitor sets the current position of the thread to the newly created node by setting the TH_CURRENT link in the descriptor of the thread to link to the newly created node at processing block 454. The monitor may then add the resources acquired to the held resources (TH_HELD) of the thread recorded in the corresponding thread descriptor at processing block 456. Then the monitor continues to observe and monitor resource operations of the multithreaded program at decision block 402.

Figure 5:
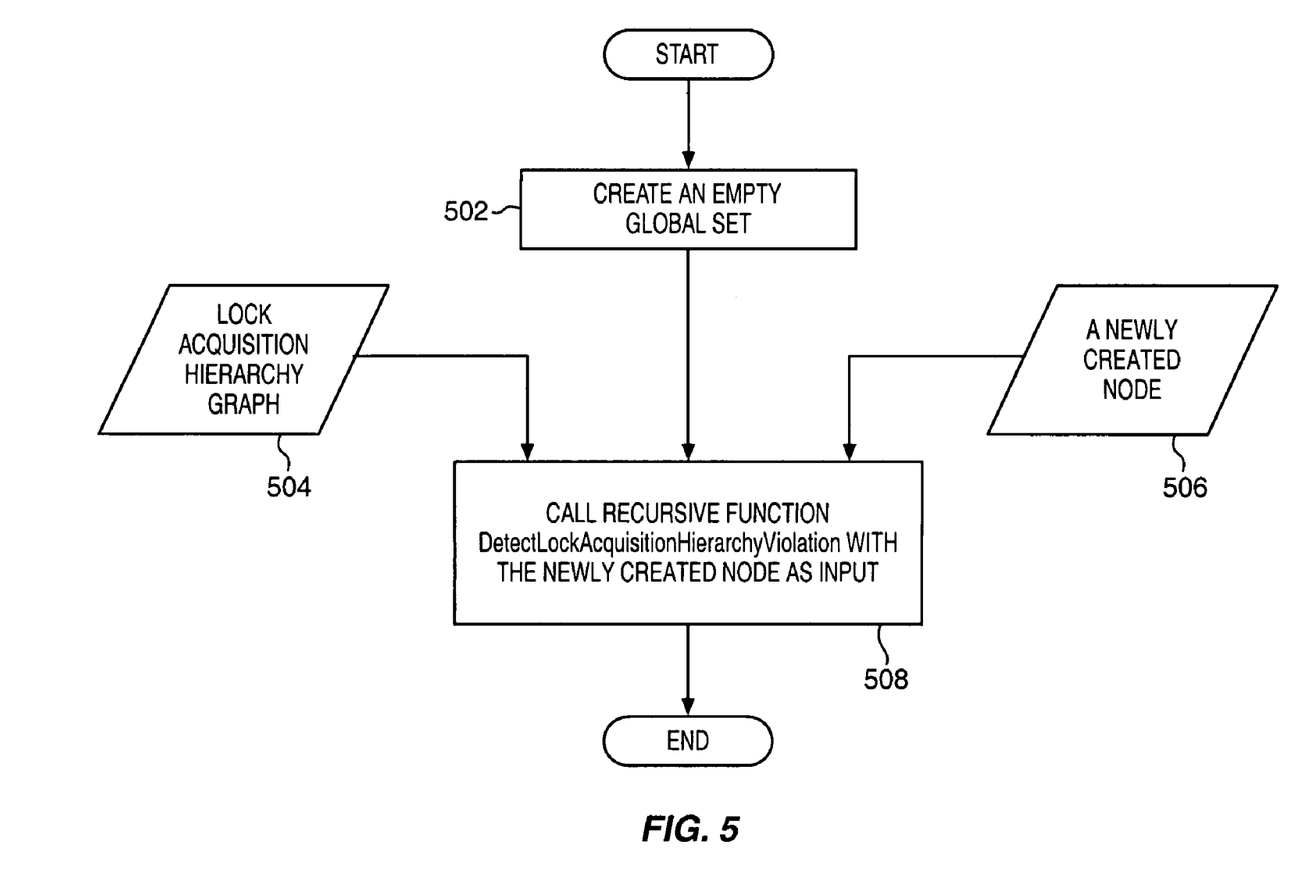
FIG. 5 is a flow diagram illustrating an embodiment of a process for detecting lock acquisition hierarchy violations in a multithreaded program.

FIG. 5 is a flow diagram illustrating an embodiment of a process for detecting lock acquisition hierarchy violations in a multithreaded program. In one embodiment, the detector is invoked when a new node having a parent is added in the graph by the resource operation monitor and the detector starts with the newly added node in the graph when it is invoked. The detector detects if there exists one or more cycles that satisfy a set of conditions in the graph. If there exists a cycle that satisfies a set of conditions in the graph, there is a violation. First, the detector creates an empty set as a global set for use at processing block 502. At processing block 508, the detector then calls a recursive function (e.g. DetectLockAcquisitionHierarchyViolation) and passes the newly created node 506 in the lock acquisition hierarchy graph 504 as input to the recursive function. After the recursive functions finally returns, the detector may end and go back to sleep waiting for the monitor to invoke it next time. Once it is invoked next time, it then restarts from processing block 502 again.

Figure 6A:
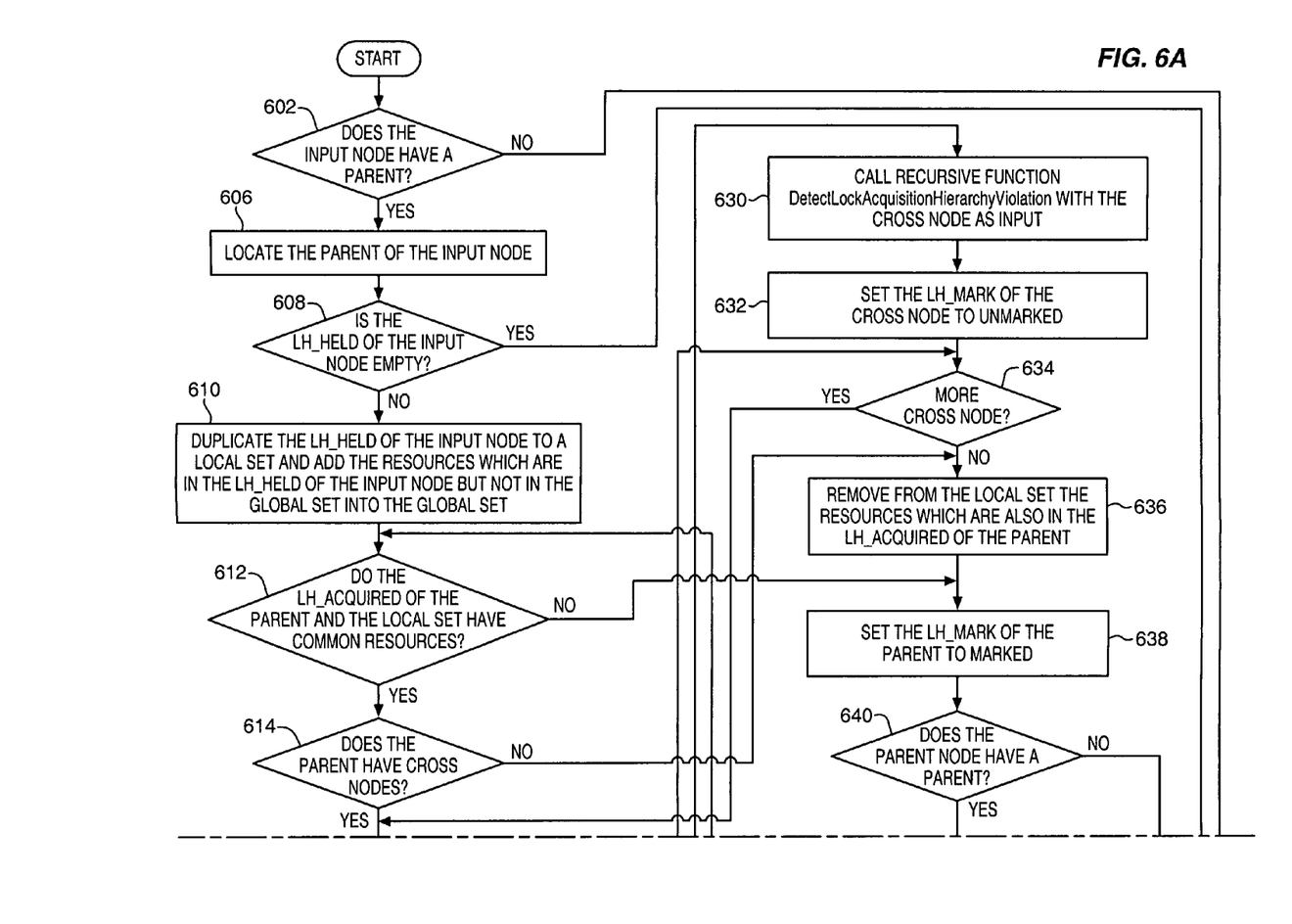
FIGS. 6A and 6B are flow diagrams illustrating an embodiment of a process for a recursive function called by a detector for detecting lock acquisition hierarchy violations in a multithreaded program.
Figure 6B:
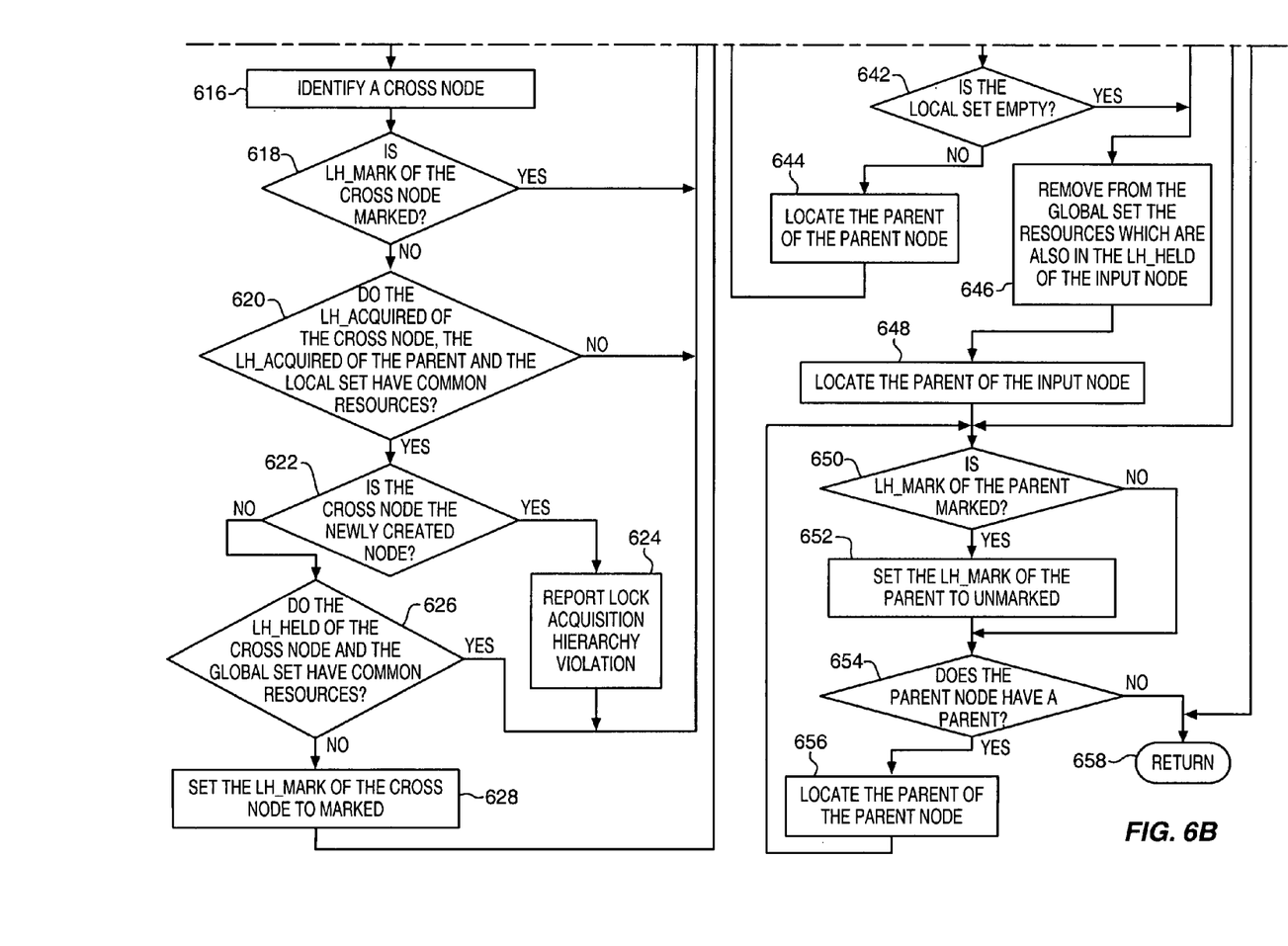

FIGS. 6A and 6B are flow diagrams illustrating an embodiment of a process for a recursive function called by a detector for detecting lock acquisition hierarchy violations in a multithreaded program. As discussed with reference to FIG. 5, first, the detector creates an empty set as a global set for use. Then, the detector calls a recursive function (e.g. DetectLockAcquisitionHierarchyViolation) and passes the newly created node as input to the recursive function.

Once the recursive function is called, the process starts with determining whether the input node has a parent at decision block 602. If not, a return is set at block 658. If yes, the parent of the input node is located at processing block 606. The held resources (LH_HELD) of the input node are then checked to determine whether they are empty at decision block 608. If empty, a determination is made as whether the parent is marked (e.g., the LH_MARK flag of the parent is set to marked) at decision block 650. If yes, the flag LH_MARK of the parent is set to unmarked at processing block 652. Once the flag is set to unmarked (at processing block 652) or the LH_MARK of the parent is determined to be not marked (at decision block 650), another determination is made as to whether the parent node has a parent at decision block 654. If yes, the parent of the parent node is located at processing block 656 and the process continues with decision block 650. If it is determined at decision block 654 that the parent node does not have a parent, a return is set at block 658.

Referring back to 608, if not empty, at processing block 610, the function duplicates the held resources (LH_HELD) of the input node to a local resource set, and then such held resources (LH_HELD) of the input node that are not in the current global set are added to the global set. Then, the function checks to determine if the acquired resources (LH_ACQUIRED) of the parent node and the local set have any common resources at decision block 612. If yes, further determination is made as to whether the parent has any cross nodes at decision block 614. If yes, at processing block 616, a cross node is identified and chosen, and the function checks to determine whether the flag LH_MARK of the identified cross node is marked at decision block 618. If not marked, a determination is made as to whether the acquired resources (LH_ACQUIRED) of the cross node, the acquired resources (LH_

ACQUIRED) of the parent node, and the local set have any resources in common at decision block 620. If yes, a determination is made as to whether the cross node is also the newly created node at decision block 622. If yes, a lock acquisition hierarchy violation is detected and the violation is reported to the user at processing block 624. Then the function continues to process another cross node if, at decision block 634, it is determined that the parent node has more cross node to be processed. Referring back to decision block 622, if the cross node is not the newly create node, the held resources (LH_HELD) of the cross node and the global set are checked to determine whether they have any common resources at decision block 626. If there are no common resources, the flag LH_MARK of the cross node is set to marked at processing block 628, and then the function calls itself recursively with the cross node as input node at processing block 630. After the recursive call returns, the function sets the flag LH_MARK of the cross node to unmarked at processing block 632. The function then continues to process another cross node if, at decision block 634, it is determined that the parent node has more cross nodes to be processed.

Referring back to decision block 626, if the held resources (LH_HELD) of the cross node and the global set have some common resources, the function may skip this cross node and process the next cross node if it is determined that the parent node has more cross node to be processed at decision block 634. Referring back to decision block 620, if the acquired resources (LH_ACQUIRED) of the cross node, the acquired resources (LH_ACQUIRED) of the parent node, and the local set do not have any common resources, the function may skip this cross node and process the next cross node if, at decision block 634, it is determined that the parent node has more cross node to be processed. Also, referring back to decision block 618, if the flag LH_MARK of the cross node is marked, the process may skip this cross node and continue to process next cross node if, at decision block 634, it is determined that the parent node has more cross node to be processed. Such processes are repeated for each cross node of the parent node.

At decision block 634, a determination is made as to whether there are more cross nodes. If yes, next cross node is identified at processing block 616 and the function continues to process the next cross node. If not, the function removes from the local set the resources that are also in acquired resources (LH_ACQUIRED) of the parent node at processing block 636. It then sets the flag LH_MARK of the parent node to marked at processing block 638. Then, the function checks if the parent node has a parent at decision block 640. If yes, at decision block 642, a determination is made as to whether the local set is empty. If not empty, at processing block 644, the parent of the parent node is located and the process returns to decision block 612. This process continues until a parent node without a parent has been encountered and processed or the local set becomes empty after processing a parent node. Referring back to decision block 612, if the acquired resources (LH_ACQUIRED) of the parent and the local set do not have common resources, the process continues at processing block 638. Also, referring back to decision block 614, if the parent is not found to have cross nodes, the process continues at processing block 636.

If the local set is empty at decision block 642 or a parent node does not have a parent at decision block 640, the function removes from the global set the resources which are also in the held resources (LH_HELD) of the input node at processing block 646 and then, the function locates the parent of the input node at processing block 648. The function sets the flag LH_MARK of the parent to unmarked at processing block 652 if, at processing block 650, it is determined that the flag LH_MARK of the parent is marked and then, determines whether the parent node has a parent at decision block 654. If the parent node has a parent, it locates the new parent node by following the parent link (LH_PARENT) of the parent node at processing block 656, and then repeats the process for the new parent at decision block 650. If it is determined the parent node does not have a parent at decision block 654, the function returns at block 658.

Figure 7:
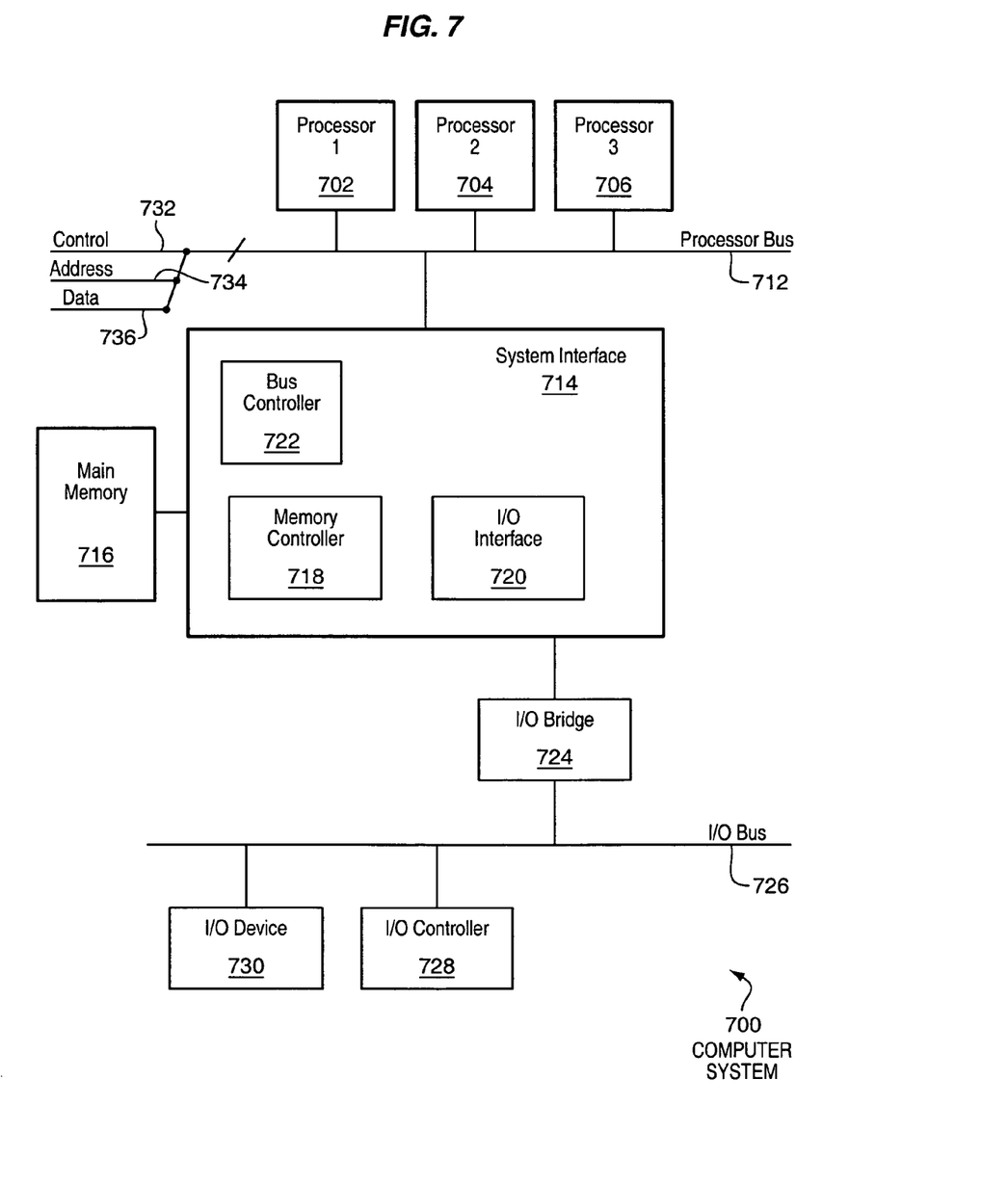
FIG. 7 is a block diagram illustrating an exemplary computer system used in implementing one or more embodiments of the present invention.

FIG. 7 is a block diagram illustrating an exemplary computer system used in implementing one or more embodiments of the present invention. The computer system (system) includes one or more processors 702-706. The processors 702-706 may include one or more single-threaded or multi-threaded processors. A typical multi-threaded processor may include multiple threads or logical processors, and may be capable of processing multiple instruction sequences concurrently using its multiple threads. Processors 702-706 may also include one or more internal levels of cache (not shown) and a bus controller or bus interface unit to direct interaction with the processor bus 712.

Processor bus 712, also known as the host bus or the front side bus, may be used to couple the processors 702-706 with the system interface 714. Processor bus 712 may include a control bus 732, an address bus 734, and a data bus 736. The control bus 732, the address bus 734, and the data bus 736 may be multidrop bi-directional buses, e.g., connected to three or more bus agents, as opposed to a point-to-point bus, which may be connected only between two bus agents.

System interface 714 (or chipset) may be connected to the processor bus 712 to interface other components of the system 700 with the processor bus 712. For example, system interface 714 may include a memory controller 718 for interfacing a main memory 716 with the processor bus 712. The main memory 716 typically includes one or more memory cards and a control circuit (not shown). System interface 714 may also include an input/output (I/O) interface 720 to interface one or more I/O bridges or I/O devices with the processor bus 712. For example, as illustrated, the I/O interface 720 may interface an I/O bridge 724 with the processor bus 712. I/O bridge 724 may operate as a bus bridge to interface between the system interface 714 and an I/O bus 726. One or more I/O controllers and/or I/O devices may be connected with the I/O bus 726, such as I/O controller 728 and I/O device 730, as illustrated. I/O bus 726 may include a peripheral component interconnect (PCI) bus or other type of I/O bus.

System 700 may include a dynamic storage device, referred to as main memory 716, or a random access memory (RAM) or other devices coupled to the processor bus 712 for storing information and instructions to be executed by the processors 702-706. Main memory 716 also may be used for storing temporary variables or other intermediate information during execution of instructions by the processors 702-706. System 700 may include a read only memory (ROM) and/or other static storage device coupled to the processor bus 712 for storing static information and instructions for the processors 702-706.

Main memory 716 or dynamic storage device may include a magnetic disk or an optical disc for storing information and instructions. I/O device 730 may include a display device (not shown), such as a cathode ray tube (CRT) or liquid crystal display (LCD), for displaying information to an end user. For example, graphical and/or textual indications of installation status, time remaining in the trial period, and other information may be presented to the prospective purchaser on the display device. I/O device 730 may also include an input device (not shown), such as an alphanumeric input device, including alphanumeric and other keys for communicating information and/or command selections to the processors 702-706. Another type of user input device includes cursor control, such as a mouse, a trackball, or cursor direction keys for communicating direction information and command selections to the processors 702-706 and for controlling cursor movement on the display device.

System 700 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 700 may be coupled with a number of clients and/or servers via a conventional network infrastructure, such as a company's Intranet and/or the Internet, for example. It is appreciated that a lesser or more equipped system than the example described above may be desirable for certain implementations.

It should be noted that, while the embodiments described herein may be performed under the control of a programmed processor, such as processors 702-706, in alternative embodiments, the embodiments may be fully or partially implemented by any programmable or hardcoded logic, such as field programmable gate arrays (FPGAs), transistor transistor logic (TTL) logic, or application specific integrated circuits (ASICs). Additionally, the embodiments of the present invention may be performed by any combination of programmed general-purpose computer components and/or custom hardware components. Therefore, nothing disclosed herein should be construed as limiting the various embodiments of the present invention to a particular embodiment wherein the recited embodiments may be performed by a specific combination of hardware components.

It should be appreciated that reference throughout this specification to "one embodiment" or "an embodiment" means that a particular feature, structure or characteristic described in connection with the embodiment included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

While certain exemplary embodiments have been described and shown in the accompanying drawings, it is to be understood that such embodiments are merely illustrative of and not restrictive, and that the embodiments of the present invention are not to be limited to specific constructions and arrangements shown and described, since various other modifications may occur to those ordinarily skilled in the art upon studying this disclosure.

What is claimed is:

1. A computer-implemented method comprising:
    constructing a lock acquisition hierarchy graph having a lock acquisition hierarchy ("hierarchy") to facilitate monitoring of resource operations corresponding to each of a plurality of threads of a multithreaded program;
    monitoring the resource operations being performed in accordance with the hierarchy;
    detecting a violation in the hierarchy, wherein the detecting of the violation is triggered with an occurrence of a change in the graph; wherein the violation is detected if a set of conditions is satisfied, and the violation is not detected if one or more of the set of conditions is not satisfied; and
    correcting the violation in the hierarchy by adding a new node to the graph,
        updating acquired resources of a corresponding thread with acquired resources of the new node, and updating held resources of the corresponding thread with held resources of the new node.

2. The computer-implemented method of claim 1, further comprising reporting the violation to a client computer system.

3. The computer-implemented method of claim 1, wherein the resource operations comprise one or more of resource acquisition operations and resource release operations.

4. The computer-implemented method of claim 1, further comprising maintaining a thread descriptor corresponding to each of the plurality of threads.

5. The computer-implemented method of claim 1, wherein the detecting of the violation comprises seeking one or more cycles satisfying the set of conditions in the graph, the set of conditions includes a plurality of conditions relating to activities of the new node and other nodes in the graph.

6. A system comprising:
    a server computer system having a processor to run a multithreaded program, the processor coupled with a storage medium via a bus, the processor including a lock acquisition mechanism to construct a lock acquisition hierarchy graph having a lock acquisition hierarchy ("hierarchy") to facilitate monitoring of resource operations corresponding to each of a plurality of threads of a multithreaded program, the lock acquisition mechanism to:
    monitor the resource operations being performed in accordance with the hierarchy;
    detect a violation in the hierarchy, wherein the detecting of the violation is triggered with an occurrence of a change in the graph; wherein the violation is detected if a set of conditions is satisfied, and the violation is not detected if one or more of the set of conditions is not satisfied; and
    correct the violation in the hierarchy by adding a new node to the graph,
        updating acquired resources of a corresponding thread with acquired resources of the new node, and updating held resources of the corresponding thread with held resources of the new node.

7. The system of claim 6, wherein the lock acquisition mechanism is further to report the violation to a client computer system in communication with the server computer system.

8. The system of claim 6, wherein the resource operations comprise one or more of resource acquisition operations and resource release operations.

9. The system of claim 6, wherein the lock acquisition mechanism is further to maintain a thread descriptor corresponding to each of the plurality of threads.

10. The system of claim 6, wherein the graph comprises lock acquisition nodes, each node representing one or more resources acquired by each thread of the plurality of threads.

11. The system of claim 6, wherein the detecting of the violation comprises seeking one or more cycles satisfying the set of conditions in the graph, the set of conditions includes a plurality of conditions relating to activities of the new node and other nodes in the graph.

12. An apparatus comprising
a processor running a multithreaded program, the processor coupled with a storage medium via a bus; and
the storage medium having stored the multithreaded program and further having stored thereon data representing sets of instructions, being executed by the processor to run the multithreaded program, cause the processor having a lock acquisition mechanism to:
construct a lock acquisition hierarchy graph having a lock acquisition hierarchy ("hierarchy") to facilitate monitoring of resource operations corresponding to each of a plurality of threads of a multithreaded program,
monitor the resource operations being performed in accordance with the hierarchy,
detect a violation in the hierarchy, wherein the detecting of the violation is triggered with an occurrence of a change in the graph; wherein the violation is detected if a set of conditions is satisfied, and the violation is not detected if one or more of the set of conditions is not satisfied; and
correct the violation in the hierarchy by adding a new node to the graph, updating acquired resources of a corresponding thread with acquired resources of the new node, and updating held resources of the corresponding thread with held resources of the new node.

13. The apparatus of claim 12, wherein the lock acquisition mechanism is further to report the violation to a client computer system coupled with a server computer system having the processor.

14. The apparatus of claim 12, wherein the resource operations comprise one or more resource acquisition operations and resource release operations.

15. The apparatus of claim 12, the lock acquisition mechanism is further to maintain a thread descriptor corresponding to each of the plurality of threads.

16. The apparatus of claim 12, wherein the graph comprises lock acquisition nodes, each node representing one or more resources acquired by each thread of the plurality of threads.

17. The apparatus of claim 12, wherein the detecting of the violation comprises seeking one or more cycles satisfying the set of conditions in the graph, the set of conditions includes a plurality of conditions relating to activities of the new node and other nodes in the graph.

18. A machine-readable medium comprising instructions which, when executed cause a machine to:
construct a lock acquisition hierarchy graph having a lock acquisition hierarchy ("hierarchy") to facilitate monitoring of resource operations corresponding to each of a plurality of threads of a multithreaded program;
monitor the resource operations being performed in accordance with the hierarchy;
detect a violation in the hierarchy, wherein the detecting of the violation is triggered with an occurrence of a change in the graph; wherein the violation is detected if a set of conditions is satisfied, and the violation is not detected if one or more of the set of conditions is not satisfied; and
correct the violation in the hierarchy by adding a new node to the graph, updating acquired resources of a corresponding thread with acquired resources of the new node, and updating held resources of the corresponding thread with held resources of the new node.

19. The machine-readable medium of claim 18, wherein the instructions which, when executed further cause the machine to report the violation to a client computer system.

20. The machine-readable medium of claim 18, wherein the resource operations comprise one or more of resource acquisition operations and resource release operations.

21. The machine-readable medium of claim 18, wherein the instructions which, when executed further cause the machine to maintain a thread descriptor corresponding to each of the plurality of threads.

22. The machine-readable medium of claim 18, wherein the graph comprises lock acquisition nodes, each node representing one or more resources acquired by each thread of the plurality of threads.

23. The machine-readable medium of claim 18, wherein the detecting of the violation comprises seeking one or more cycles satisfying the set of conditions in the graph, the set of conditions includes a plurality of conditions relating to activities of the new node and other nodes in the graph.

* * * * *

UNITED STATES PATENT AND TRADEMARK OFFICE
CERTIFICATE OF CORRECTION

PATENT NO.       : 7,657,894 B2                                                                        Page 1 of 1
APPLICATION NO.  : 10/955605
DATED            : February 2, 2010
INVENTOR(S)      : Ma et al.

It is certified that error appears in the above-identified patent and that said Letters Patent is hereby corrected as shown below:

In section (75) delete "Zhiquiang" and insert --Zhiqiang--.

Signed and Sealed this

Tenth Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,657,894 B2  Page 1 of 1
APPLICATION NO. : 10/955605
DATED : February 2, 2010
INVENTOR(S) : Ma et al.

It is certified that error appears in the above-identified patent and that said Letters Patent is hereby corrected as shown below:

Title Page, Item (75) Inventors, delete "Zhiquiang" and insert --Zhiqiang--.

This certificate supersedes the Certificate of Correction issued August 10, 2010.

Signed and Sealed this

Thirty-first Day of August, 2010

David J. Kappos
*Director of the United States Patent and Trademark Office*